Figure 1:
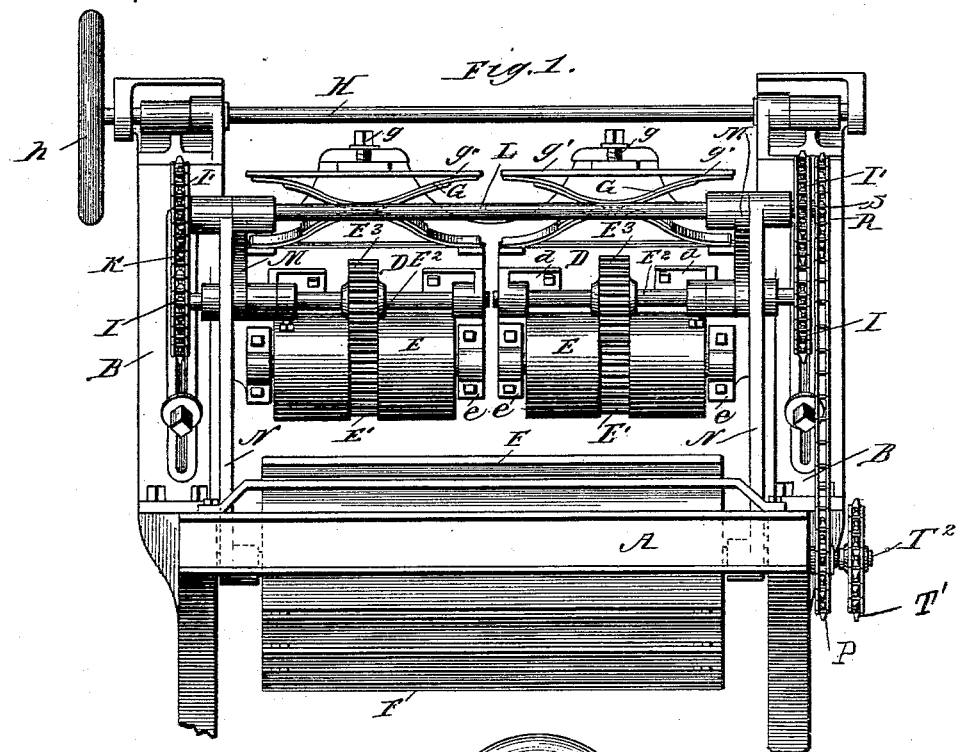

(No Model.)

G. F. WETHERELL & R. B. JONES.
WOOD PLANING MACHINE.

No. 401,397. Patented Apr. 16, 1889.

Witnesses.
W. Rossiter
T. D. Sydnor

Inventor
Geo. F. Wetherell & R. B. Jones
By Pierce & Fisher
Their Attys.

N. PETERS, Photo-Lithographer, Washington, D. C.

UNITED STATES PATENT OFFICE.

GEORGE F. WETHERELL AND RICHARD B. JONES, OF CHICAGO, ILLINOIS, ASSIGNORS OF ONE-THIRD TO RANSOM RICHARDS, OF SAME PLACE.

WOOD-PLANING MACHINE.

SPECIFICATION forming part of Letters Patent No. 401,397, dated April 16, 1889.

Application filed September 27, 1887. Serial No. 250,806. (No model.)

*To all whom it may concern:*

Be it known that we, GEORGE F. WETHERELL and RICHARD B. JONES, citizens of the United States, residing at Chicago, in the county of Cook and State of Illinois, have invented certain new and useful Improvements in Wood-Planing Machines, of which we do declare the following to be a full, clear, and exact description, reference being had to the accompanying drawings, forming part of this specification.

Our present invention has relation to that class of wood-planing machines wherein the lumber to be planed is fed beneath an appropriate cutter-head by means of a slatted traveling carrier belt or table, and one or more presser-rolls mounted above such belt or table in proximity to the cutter-head. In this class of machines it is customary to sustain the presser-rolls in suitable bearings that are capable of vertical movement, the rolls being forced normally in downward direction to exert pressure upon the lumber by means of suitable springs, and prior to our present invention these presser-rolls have been simply "idlers," serving merely to force the lumber in firm contact with the carrier belt or table. An example of this type of wood-planing machine is illustrated in Letters Patent No. 318,064, granted to us and to Ransom Richards, as our assignee, May 19, 1885.

A difficulty encountered in the use of this type of machine is that when the lumber being planed is of slightly varying thickness, is warped or rough, or, as sometimes happens in winter weather, has snow or icy places upon it, there is danger of irregularity occurring in the feed of the boards to the cutter-head, as the carrier-table is apt to slip somewhat beneath the lumber, and it is obvious that when such irregular feeding of the lumber occurs a correspondingly-irregular action of the cutter-head upon the surface of the boards results. Moreover, when, as in such prior construction of machines, the presser-rolls are simply idlers, bearing, as they must, with great force against the surface of the lumber, it is necessary that considerable power should be applied to the traveling feed-table in order to overcome the friction of the idlers and secure a sufficient bite or clamping action between them and the carrier-table to advance the lumber to the cutter-head.

Our present invention has for its object to remedy the defects incident to the employment of idler presser-rolls in this class of planing-machines; and to this end it consists, primarily, in the combination, with an endless carrier-belt or feed-table and a suitable presser roll or rolls, of mechanism for imparting rotation thereto, so that the rolls will operate not merely to impart the necessary pressure of the lumber against the feed-table, but will also serve to aid in the positive advance or feed of the lumber beneath the cutter-head.

Our invention consists, also, in various details of construction, hereinafter described, illustrated in the accompanying drawings, and particularly defined in the claims at the end of this specification.

Figure 2:
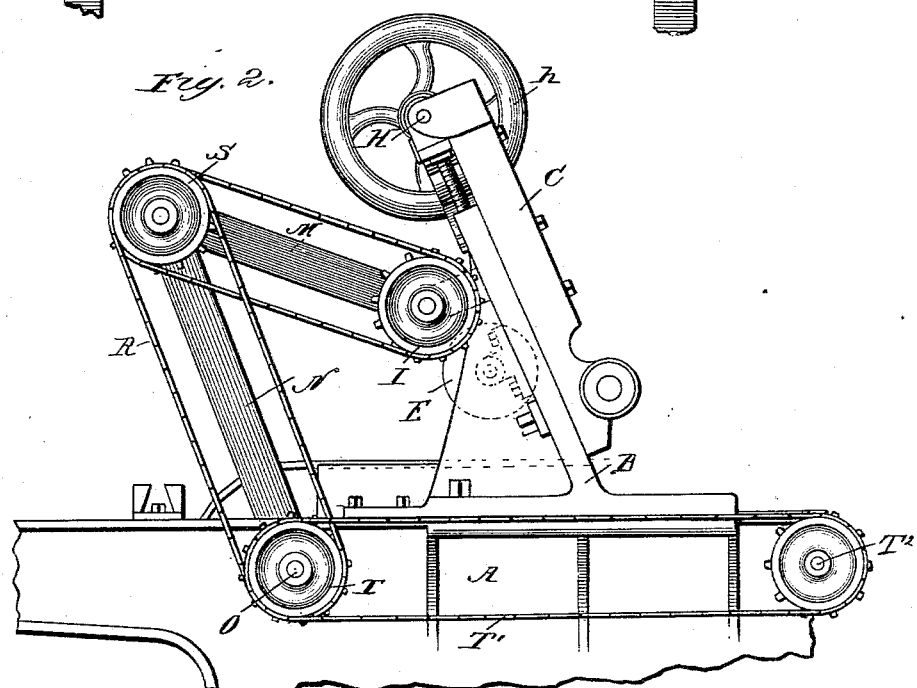

Figure 1 is a front view of a planing-machine embodying our invention. Fig. 2 is a side view of such machine.

A designates the main frame of the planing-machine, from the sides of which rise the upright posts B, that serve to sustain the usual cross-head, C, that carries the cutter-head, and to this cross-head is connected the vertically-movable plates or housings D, carrying the presser-rolls E, that are bolted to the cross-head in such manner as to permit of their vertical movement above the feed-table F, to compensate for any irregularities in the surface of the lumber to be planed or differences in thickness thereof. Upon the top of these housings D bear the presser-springs G, the tension of which is varied by means of suitable adjusting-screws, $g$, that bear upon the plates $g'$ of the springs. In our present construction, as in that set forth in our patent of May 19, 1885, the main adjustment of the cross-head and of the housings will be effected in a well-known manner by means of the cross-shaft H and its hand-wheel $h$. So, also, as in our said patent, the feed-table is formed, as shown, of slats or lags, united in the usual manner by links that engage with the teeth of the usual sprocket-wheels, from which movement is imparted to said table. The presser-rolls E are mounted in suitable journal-bearings, e, projecting from the face of the housings D, and are preferably two in number, although it will be readily understood that without departing from the spirit of our invention a single presser-roll may be employed.

In order to impart to the presser-rolls a positive rotation necessary to enable them to co-act with the traveling table or carrier F, so as to advance the lumber to the cutter-head, we preferably provide the central portion of each presser-roll with the cog-wheel E', the diameter of which is somewhat smaller than that of the roll, so that such cog-wheel will not bear upon the surface of the lumber. Our purpose in thus arranging the cog-wheels E' at the center of the presser-rolls is to enable a firm and uniform bearing of such rolls to be obtained throughout their length; but it is obvious that without departing from the spirit of our invention the cog-wheels might be otherwise arranged—as, for example, one at each end of each of the presser-rolls.

Upon each of the plates or housings D is mounted in suitable bearings, $d$, a shaft, $E^2$, having fixed about its central portion a gear-wheel, $E^3$, that engages with the cog-wheels E' of the presser-roll immediately beneath it, and to the outer end of each of these shafts $E^2$ is fixed a sprocket-wheel, I, that is connected by means of a link-belt, K, with a similar sprocket-wheel, I', one on each end of the transverse shaft L. This shaft L extends from side to side of the machine and is journaled near its ends in the swinging arms M and N, the opposite ends of the arms M encircling the shafts $E^2$, while the lower ends of the arms N are held in a manner free to turn upon the drive-shaft O, that extends from side to side of the machine beneath the carrier-belt F. It will be seen that by means of these swinging arms M and N the transverse shaft L is held in such manner that its position can vary to compensate for the movements of the shafts $E^2$ incident to the vertical movements and adjustment of the plates or housings D, whereon said shafts are sustained.

To one end of the driving-shaft O is fixed a sprocket-wheel, P, which, through the medium of the link-belt R, serves to transmit motion to the sprocket-wheel S, that is fixed to one end of the shaft L, adjacent one of the sprocket-wheels I'. The shaft O may be driven by a belt, T', leading from the shaft $T^2$, that drives the feed-table.

From the foregoing description the operation of our improved mechanism will be seen to be as follows: The boards to be planed will be placed upon the traveling belt or carrier F in the usual manner, and their ends will be passed beneath the presser-rolls E. These rolls E, being positively driven by the gearing already described, will co-operate with the traveling belt or carrier F in forcing the boards with a positive feed beneath the cutter-head, whereby their surfaces are to be planed. It will thus be seen that by imparting a positive rotation to the presser-rolls E not only will these rolls serve to firmly hold the boards against the traveling belt or carrier F, but will also assist the carrier in advancing them beneath the cutter-head, so that although irregularities may occur upon the surface of the lumber, which would tend to impede their movement beneath ordinary idler presser-rolls, the positive rotation of our improved presser-rolls will, notwithstanding such irregularities, cause the uniform advance of the lumber to the cutter-head. So, also, by driving the presser-rolls in the manner above described much less power is required to overcome their friction than is necessary with the idler presser-rolls heretofore employed, and in case of snow or ice occurring upon the surface of the boards the positive feeding action of the presser-rolls, as well as of the carrier-belt, will avoid the danger of the slipping of the boards between the presser-rolls and the belt, and will consequently avoid the defective planing of the lumber incident thereto. By mounting the shafts $E^2$ and gear-wheels $E^3$ upon the plates or housings D it will be seen that these shafts and wheels partake of the vertical movements and adjustments of the presser-rolls, and consequently remain at all times in engagement with the cog-wheels thereof, and by reason of the connection of the transverse shaft L with the shafts E, in the manner described, the presser-rolls will be at all times uniformly driven, notwithstanding any vertical movement that may be given thereto.

It will be readily understood that the details of construction above set out, both as to the character and arrangement of the gearing by which rotation is imparted to the presser-rolls, may be varied by the skilled mechanic without departing from the spirit of our invention, and to such details therefor our invention is not to be understood as restricted. So, also, our improvements may be applied to other forms of planing-machine than such as have the particular type of carrier belt or table hereinbefore described.

Having thus described our invention, what we claim as new, and desire to secure by Letters Patent, is—

1. In a wood-planing machine, the combination, with a positively-driven endless carrier-belt or feed-table formed of slats or lags and with a vertically-movable presser roll or rolls, of suitable gearing for driving said roll or rolls, substantially as described.

2. In a wood-planing machine, the combination, with an endless carrier-belt or feed-table formed of slats or lags and with vertically-movable presser-rolls, of suitable gearing for driving said rolls, extending between the shafts of said rolls and the drive-shaft of the endless carrier-belt or feed-table, substantially as described.

3. In a wood-planing machine, the combination, with the vertically-movable presser-rolls and vertically-movable housings, wherein said rolls are sustained, of cog-wheels upon the shaft of said rolls, vertically-movable gear-wheels for driving said rolls, vertically-movable shafts carrying said gear-wheels and journaled upon the movable housings, and suitable gearing for driving said shaft, all substantially as described.

4. In a wood-planing machine, the combination, with vertically-movable presser-rolls, of cog-wheels for said rolls, gear-wheels engaging with said cog-wheels, shafts for said gear-wheels extending across said presser-rolls, vertically-movable housings wherein said shafts and said presser-rolls are mounted, a transverse shaft in gear with the shafts of said gear-wheels, and a driving-shaft in gear with said transverse shaft, substantially as described.

5. In a wood-planing machine, the combination, with vertically-movable presser-rolls and housings wherein said rolls are mounted, of the gear-wheels for driving said rolls, provided with shafts journaled in said housings, sprocket-wheels upon said shafts, a transverse shaft mounted upon movable arms and provided with sprocket-wheels, belts leading from said transverse shaft to the shafts on the housings, a slatted carrier-belt, and suitable gearing extending between said transverse shaft and the shaft that drives the carrier-belt, substantially as described.

GEO. F. WETHERELL.
RICHARD B. JONES.

Witnesses:
GEO. P. FISHER, Jr.,
I. B. CARPENTER.